United States Patent
Chikugo et al.

(10) Patent No.: US 8,715,874 B2
(45) Date of Patent: May 6, 2014

(54) FUEL CELL SYSTEM AND METHOD FOR CONTROLLING FUEL CELL SYSTEM

(75) Inventors: Hayato Chikugo, Yokohama (JP); Ryoichi Shimoi, Yokohama (JP); Mitsunori Kumada, Yokosuka (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 333 days.

(21) Appl. No.: 12/918,345

(22) PCT Filed: Jun. 9, 2009

(86) PCT No.: PCT/IB2009/005896
§ 371 (c)(1),
(2), (4) Date: Sep. 22, 2010

(87) PCT Pub. No.: WO2009/150516
PCT Pub. Date: Dec. 17, 2009

(65) Prior Publication Data
US 2011/0086285 A1    Apr. 14, 2011

(30) Foreign Application Priority Data
Jun. 11, 2008   (JP) ................... 2008-153330

(51) Int. Cl.
*H01M 8/04*    (2006.01)

(52) U.S. Cl.
USPC ............................. 429/429; 429/446; 429/433

(58) Field of Classification Search
USPC ................................................ 429/429, 446
See application file for complete search history.

(56) References Cited

U.S. PATENT DOCUMENTS

2002/0182474 A1* 12/2002 Saito ................................ 429/38
2003/0072980 A1* 4/2003 Formanski et al. ............. 429/13
2003/0232227 A1* 12/2003 VanZee et al. ................... 429/25
2004/0013919 A1* 1/2004 Ueda et al. ...................... 429/22
2005/0214604 A1* 9/2005 Goto et al. ....................... 429/22
2007/0269695 A1* 11/2007 Yamazaki et al. ............... 429/25

FOREIGN PATENT DOCUMENTS

| JP | 2005-158557 | 6/2005 |
| JP | 2005-267969 | 9/2005 |
| JP | 2007-59348  | 3/2007 |
| JP | 2007-103023 | 4/2007 |
| JP | 2007-157621 | 6/2007 |
| JP | 2007-265676 | 10/2007 |
| JP | 2008-10347  | 1/2008 |
| JP | 2008-78101  | 4/2008 |

* cited by examiner

*Primary Examiner* — Kenneth Douyette
*Assistant Examiner* — James Lee
(74) *Attorney, Agent, or Firm* — Drinker Biddle & Reath LLP (57) ABSTRACT

A fuel cell system includes a fuel cell having an anode, a cathode, and an electrolyte membrane disposed therebetween. An oxidant gas supplying device supplies oxidant gas to the cathode, an oxidant gas backpressure regulating device regulates the pressure of the oxidant gas at the cathode according to a valve opening, and a pressure detecting device detects the oxidant gas pressure at the cathode. During a start-up fuel gas disposal process, a controller controls the oxidant gas supplying device to supply the oxidant gas at a standard oxidant gas flow, controls the valve opening of the oxidant gas backpressure regulating device to a first valve opening, and controls the valve opening of the oxidant gas backpressure regulating device to a second valve opening which is greater than the first valve opening when the oxidant gas pressure detected by the pressure detecting device reaches an elevation target pressure.

15 Claims, 7 Drawing Sheets

FUEL CELL SYSTEM AND METHOD FOR CONTROLLING FUEL CELL SYSTEM

CROSS-REFERENCE TO RELATED APPLICATIONS

This application claims priority to Japanese Patent Application No. 2008-153330 filed Jun. 11, 2008 which is incorporated by reference herein in its entirety.

BACKGROUND OF THE INVENTION

1. Field of the Invention

The present invention relates to fuel cell systems and methods for controlling fuel cell systems.

2. Description of the Related Art

Fuel cell systems equipped with fuel cells that include anodes, cathodes, and electrolyte membranes therebetween generate power by electrochemical reactions between a fuel gas (e.g., hydrogen) supplied to the anodes and an oxidant gas (e.g., air) supplied to the cathodes through the electrolyte membranes. With this type of fuel cell system, fuel gas remaining in the anodes sometimes permeates the electrolyte membranes and enters into the cathodes during a shutdown period of the system. If such a phenomenon occurs, fuel gas accumulates at the cathodes and in the oxidant gas systems through which the oxidant is normally supplied to or discharged from the cathodes.

In attempt to remedy this problem, Japanese Unexamined Patent Application Publication No. 2007-103023 discloses a fuel cell system including an oxidant gas system having an air compressor for supplying oxidant, in which a shutoff valve is provided upstream of a fuel cell and a pressure regulating valve is provided downstream of the fuel cell. In starting this fuel cell system, oxidant gas is supplied with the pressure regulating valve closed, and then the shut valve is closed when the pressure of the oxidant gas reaches a particular level. As a result, the oxidant gas is enclosed. Then fuel gas in the oxidant gas system (i.e., in the cathode and oxidant gas piping) is consumed on a catalyst of the fuel cell and thereby becomes diluted.

However, if the fuel gas concentration in the oxidant gas system is large, the required pressure of the oxidant gas to accomplish dilution may be excessively high. In such a case, as the load of the air compressor for supplying the oxidant gas increases, the power consumption, driving noise, and vibrations may also undesirably increase.

SUMMARY OF THE INVENTION

The present invention provides a system and method for diluting and exhausting fuel gas that has permeated the electrolyte membrane during a shut-down period of the fuel cell while limiting the load imposed on an oxidant gas supplying device. The concentration of fuel gas in the cathode is decreased both by providing the oxidant gas at an elevated pressure and by the stirring effect created by flowing the oxidant gas through the cathode once an elevated target pressure has been reached.

In one embodiment of the invention, a fuel cell system is provided. The system includes a fuel cell having an anode, a cathode, and an electrolyte membrane disposed between the anode and the cathode. The fuel cell is configured to generate electrical power through electrochemical reactions between a fuel gas supplied to the anode and an oxidant gas supplied to the cathode. The system further includes an oxidant gas supplying device configured to supply the oxidant gas to the cathode of the fuel cell, an oxidant gas backpressure regulating device configured to regulate the pressure of the oxidant gas at the cathode of the fuel cell according to a valve opening, the oxidant gas backpressure regulating device being disposed downstream of an oxidant gas outlet of the fuel cell, and a first pressure detecting device configured to detect the pressure of the oxidant gas at the cathode of the fuel cell. A controller is provided for controlling the fuel cell system during a start-up fuel gas disposal process, the controller being configured to control the oxidant gas supplying device to supply the oxidant gas at a standard oxidant gas flow, control the valve opening of the oxidant gas backpressure regulating device to a first valve opening, and control the valve opening of the oxidant gas backpressure regulating device to a second valve opening which is greater than the first valve opening when the pressure of the oxidant gas detected by the first pressure detecting device reaches an elevation target pressure, thereby diluting with oxidant gas any fuel gas that has permeated through the membrane from the anode to the cathode during a shut-off period of the system.

In another embodiment of the invention, a start-up fuel gas disposal process for a fuel cell system is provided, the fuel cell system having a fuel cell including an anode, a cathode, and an electrolyte membrane disposed between the anode and the cathode, wherein during a shut-off period of the fuel cell system, fuel gas has permeated through the membrane from the anode to the cathode. The process includes supplying oxidant gas to the cathode of the fuel cell at a standard oxidant gas flow, detecting the oxidant gas pressure at the cathode of the fuel cell, controlling the oxidant gas pressure to increase by setting a valve opening of an oxidant gas backpressure regulating device disposed downstream of an oxidant gas outlet of the fuel cell to a first valve opening, setting an elevation target pressure, determining whether the oxidant gas pressure has reached the elevation target pressure, and when the pressure of the oxidant gas has reached the elevation target pressure, setting the valve opening of the oxidant gas backpressure regulating device to a second valve opening which is greater than the first valve opening.

BRIEF DESCRIPTION OF THE DRAWINGS

The accompanying drawings, which are incorporated herein and constitute part of this specification, illustrate preferred embodiments of the invention, and together with the general description given above and the detailed description given below, serve to explain features of the invention.

DESCRIPTION OF THE PREFERRED EMBODIMENTS

Figure 1:
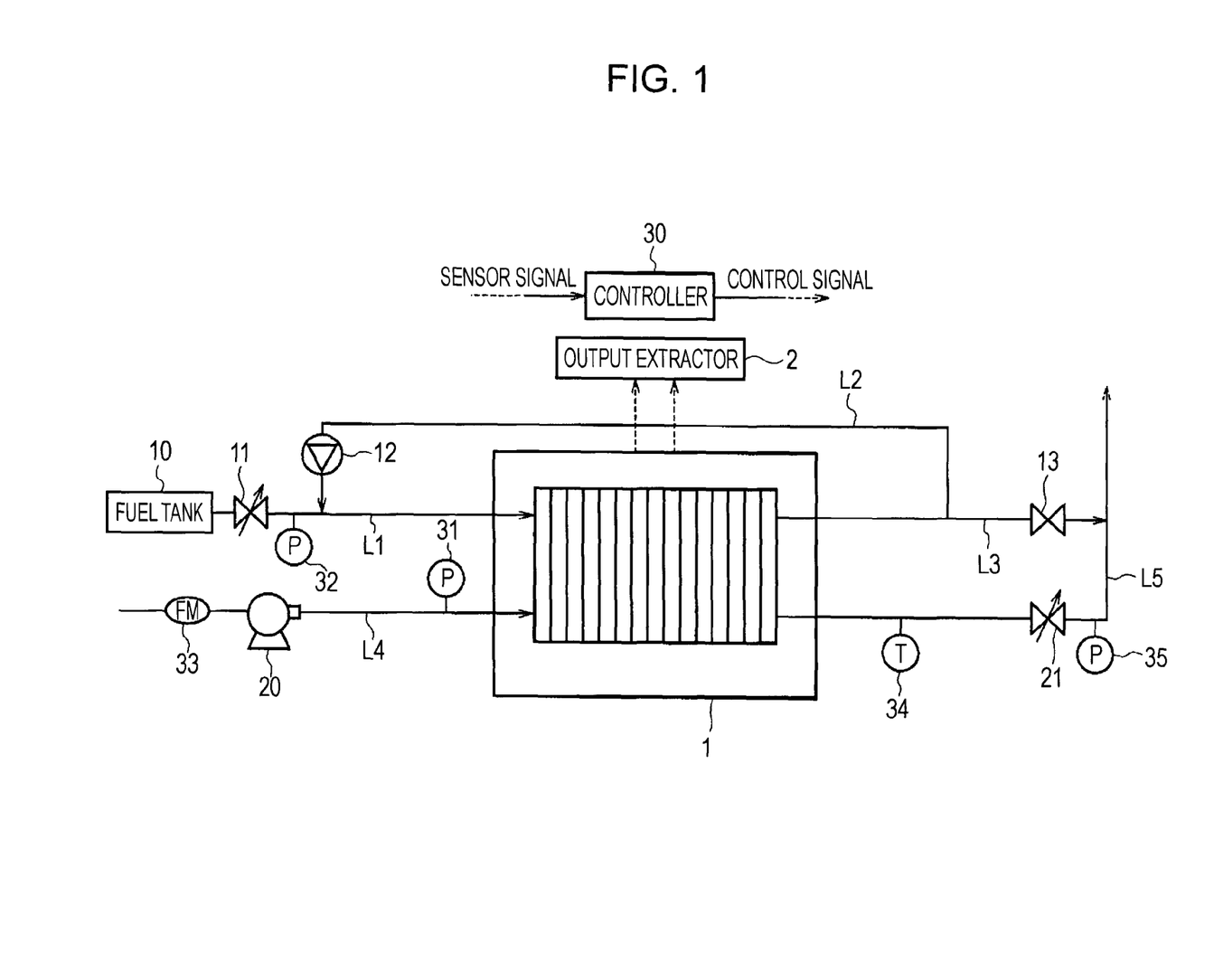
FIG. 1 is a schematic diagram showing a fuel cell system.

Embodiments of the present invention are described below with reference to the drawings. FIG. 1 is a schematic diagram showing a fuel cell system according to one embodiment of the present invention. The fuel cell system is, for example, mounted on a moving object such as a vehicle which is driven by power supplied from the fuel cell system.

The fuel cell system includes a fuel cell stack 1 (interchangeably termed a "fuel cell" herein) comprising a plurality of fuel cell structures stacked with separators therebetween. Each fuel cell structure includes an anode and a cathode that face each other with a polymer electrolyte membrane disposed between the anode and the cathode. As fuel gas is supplied to the anode and oxidant gas is supplied to the cathode, electrochemical reactions occur between the fuel gas and the oxidant gas through the polymer electrolyte membrane and the fuel cell stack 1 thereby generates power. In this embodiment, hydrogen is used as the fuel gas and air is used as the oxidant gas. However, it is understood the fuel gas is not limited to hydrogen but can include any hydrogen-containing fuel gas. Similarly, the oxidant gas is not limited to air but can include any other oxygen-containing gas or gas mixture.

The fuel cell system is equipped with a hydrogen supply/discharge system for supplying hydrogen to the fuel cell stack 1 and an air supply/discharge system for supplying air to the fuel cell stack 1.

In the hydrogen supply/discharge system, hydrogen serving as fuel gas is stored in a fuel tank (fuel gas supplying device) 10 such as a high pressure hydrogen gas cylinder. Hydrogen is supplied from the fuel tank 10 to the fuel cell stack 1 through a hydrogen supply channel L1. In particular, the hydrogen supply channel L1 is provided with a tank side valve (not shown) downstream of the fuel tank 10 and a pressure-reducing valve (not shown) downstream of the tank-side valve. When the tank-side valve is opened, the pressure of the highly compressed hydrogen gas from the fuel tank 10 is mechanically reduced to a particular pressure with the pressure-reducing valve. The hydrogen supply channel L1 is also provided with a hydrogen pressure regulating valve (fuel gas pressure regulating device) 11 downstream of the pressure-reducing valve. The hydrogen pressure regulating valve 11 regulates the pressure of hydrogen so that the hydrogen pressure, once reduced with the pressure-reducing valve, is supplied at a desired pressure level at the anodes of the fuel cell stack 1.

Fuel off-gas (i.e., gas containing unused hydrogen that was not consumed in the fuel cell) from each of the anodes of the fuel cell stack 1 is discharged to a hydrogen recirculation channel L2. The hydrogen recirculation channel L2 has one end connected to a point downstream of the hydrogen pressure regulating valve 11 of the hydrogen supply channel L1. The hydrogen recirculation channel L2 is provided with hydrogen recirculation means such as a hydrogen recirculation pump 12. Fuel off-gas from the anodes of the fuel cell stack 1 is recirculated to the anodes of the fuel cell stack 1 through the hydrogen recirculation means.

In the case in which the oxidant gas is air, impurities (such as nitrogen) contained in the oxidant gas supplied to the cathodes may penetrate the polymer electrolyte membrane into the anode side. This likely leads to an increase in the impurity concentration in the recirculation system including the anodes and the hydrogen circulation channel L2 and a decrease in hydrogen partial pressure. When the impurity concentration is high, problems such as decreased output from the fuel cell stack 1 and the like may arise. Thus, the impurity concentration in the circulation system needs to be managed.

In this regard, the hydrogen recirculation channel L2 is provided with a purge channel L3 (discharge channel) for purging the recirculation system of the impurities. The purge channel L3 includes a purge valve (discharging device) 13. The recirculating gas flowing in the hydrogen recirculation channel L2 can be discharged to the outside through an off-gas discharge channel L5 described below by controlling the open/close state of the purge valve 13. As a result, the system can be purged of impurities and the impurity concentration in the circulation system can be controlled.

In the air supply/discharge system, air serving as the oxidant gas is supplied to the fuel cell stack 1 through an air supply channel L4. In particular, the air supply channel L4 includes a compressor (oxidant gas supplying device) 20. The compressor 20 takes in atmosphere (air), compresses the air, and discharges the compressed air. The compressed air is supplied to the fuel cell stack 1.

Oxidant off-gas (air from which oxygen has been consumed) from the individual cathodes of the fuel cell stack 1 is discharged to the outside through the off-gas discharge channel L5. The off-gas discharge channel L5 is provided with an air backpressure regulating valve (oxidant gas backpressure regulating device) 21. In other words, the air backpressure regulating valve 21 is provided downstream of the exit of air from the fuel cell stack 1. The pressure of air at the cathodes of the fuel cell stack 1 is controlled by the valve opening of the air backpressure regulating valve 21. One end of the purge channel L3 of the hydrogen supply/discharge system is connected to the air discharge channel L5 at a point downstream of the air backpressure regulating valve 21. With this structure, hydrogen contained in the fuel off-gas discharged through the purge channel L3 is diluted with oxidant off-gas from the cathodes of the fuel cell stack 1 in the off-gas discharge channel L5 before being discharged to outside of the fuel cell system.

An output extractor 2 that controls the output (e.g., electrical current) from the fuel cell stack 1 is connected to the fuel cell stack 1. Power generated in the fuel cell stack 1 is supplied through the output extractor 2 to an electric motor, a battery, various auxiliary machineries (e.g., the compressor 20, the hydrogen circulation pump 12, and the like) used for power generation by the fuel cell stack 1, and various auxiliary machineries (such as air conditioners) for vehicles.

A controller 30 performs the function of integrally controlling the entire system. The controller 30 is operated according to a control program and thereby controls the operation status of the system. The controller 30 may be a microcomputer mainly comprising a CPU, a ROM, a RAM, and an I/O interface. The controller 30 performs various calculations based on the status of the system and outputs calculated results in the form of control signals to various actuators (not shown). As a result, the controller 30 controls the valve opening of the hydrogen backpressure regulating valve 11, the rotating rate of the hydrogen recirculation pump 12, the rotating rate of the air compressor 20, the valve opening of the air backpressure regulating valve 21, the open/close state of the purge valve 13, and the amount of electric current extracted through the output extractor 2.

Sensor signals are input to the controller 30 from various sensors and the like in order to detect the status of the system. An air pressure sensor (first pressure detecting device) 31 detects the pressure of air at the cathodes of the fuel cell stack 1. A hydrogen pressure sensor 32 detects the pressure of hydrogen at the anodes of the fuel cell stack 1. An air flow sensor 33 detects the flow of air supplied to the cathodes of the fuel cell stack 1. An air temperature sensor (temperature detecting device) 34 detects the exhaust air temperature, i.e., the temperature of air discharged from the cathodes of the fuel cell stack 1. A downstream pressure sensor (second pressure detecting device) 35 detects the downstream air pressure, i.e., the pressure of air downstream of the air backpressure regulating valve 21. In the case where the fuel cell system is equipped with an atmospheric pressure sensor, the downstream pressure sensor 35 may be omitted and the pressure detected by the atmospheric pressure sensor may be assumed to be the downstream pressure.

In this embodiment, during a start-up operation executed in starting the system, the controller 30 performs a start-up hydrogen disposal process whereby hydrogen present at the cathodes of the fuel cell stack 1 and in the air supply/discharge system is disposed of by first diluting and then discharging the hydrogen from the fuel cell stack 1. To be specific, in starting the system, the controller 30 controls the valve opening of the air backpressure regulating valve 21 to a first valve opening to allow air to be supplied from the compressor 20 at a standard air flow rate. The first valve opening is a minimum level or a minimum valve opening amount that allows for a small flow rate of air, significantly less than the standard air flow rate, to be exhausted from the cathodes of the fuel cell stack 1, so that the pressure at the cathodes can be increased. Once the pressure at the cathodes of the fuel cell stack 1 reaches an elevation target pressure, i.e., a target pressure for pressure elevation, the controller 30 increases the valve opening of the air backpressure regulating valve 21 to a second valve opening. The second valve opening is a release level or releasing valve opening that is larger than the first valve opening to allow a larger amount of air to be exhausted from the cathodes of the fuel cell stack 1 so that the pressure at the cathodes can be decrease. In particular, the second valve opening is sufficiently large that an amount of air equal to or at least slightly larger than the standard air flow rate is released from the cathodes.

Figure 2:
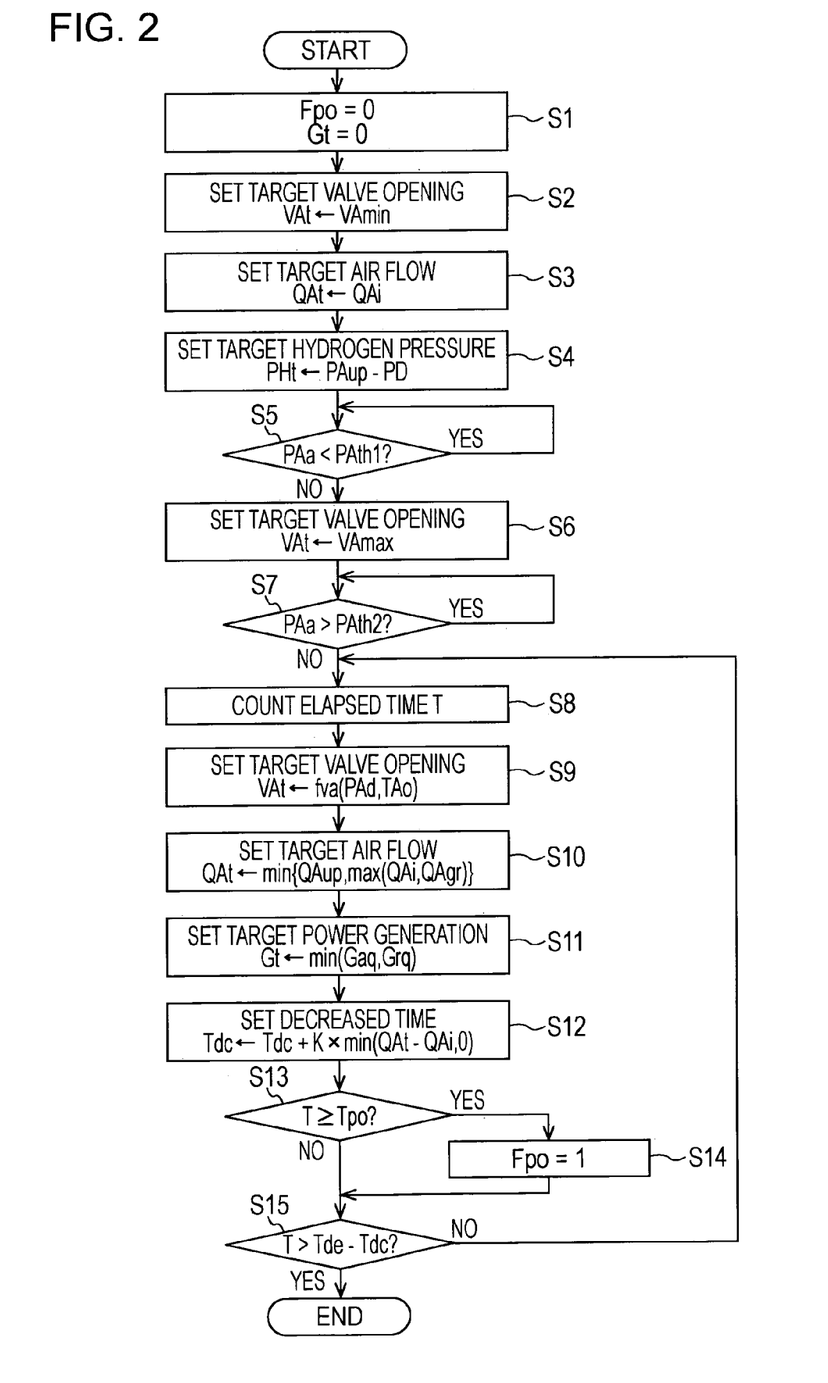
FIG. 2 is a flowchart showing steps of a method for controlling the fuel cell system.

FIG. 2 is a flowchart showing the steps of a method for controlling the fuel cell system according to one embodiment of the present invention. A sequence of steps shown in this flowchart shows the flow of the start-up hydrogen disposal process executed as a part of the start-up operation. For example, the process is executed by the controller 30 triggered by an ignition switch ON signal of the fuel cell system.

First, in step S1, a purge flag Fpo is set to 0 and the target power generation Gt is set to 0. The purge flag Fpo is a flag that indicates whether or not the impurity purge is permitted. In particular, if the purge flag Fpo is set to 0, the impurity purge is not permitted and the purge valve 13 is controlled to close. If the purge flag Fpo is set to 1, the impurity purge is permitted and the purge valve 13 is controlled to open. The reason for not performing the impurity purge at the time the start-up hydrogen disposal process begins is as follows. When the impurity purge is executed, recirculating gas containing hydrogen flowing in the hydrogen recirculation channel L2 flows into the off-gas discharge channel L5. But when the start-up hydrogen disposal process is performed, hydrogen flows into the off-gas discharge channel L5 from the cathodes. Therefore, if the impurity purge and the start-up hydrogen disposal process are performed simultaneously, the two hydrogen flows (from fuel off-gas and oxidant off-gas containing hydrogen gas that has permeated through the membrane during the shutdown period) occur simultaneously and the hydrogen concentration in combined off-gas discharged outside through the off-gas discharge channel L5 may increase excessively. The target power generation Gt is a target value of electrical power to be generated in the fuel cell stack 1. The process proceeds to step S2.

In step S2, a target valve opening VAt is set. The target valve opening VAt is the target value related to control of the valve opening of the air backpressure regulating valve 21, and the controller 30 controls the valve opening of the air backpressure regulating valve 21 on the basis of the target valve opening VAt. In step S2, the target valve opening VAt is set to be a minimum valve opening VAmin related to the air backpressure regulating valve 21. The minimum valve opening is the first valve opening discussed above. The process proceeds to step S3.

Figure 9:
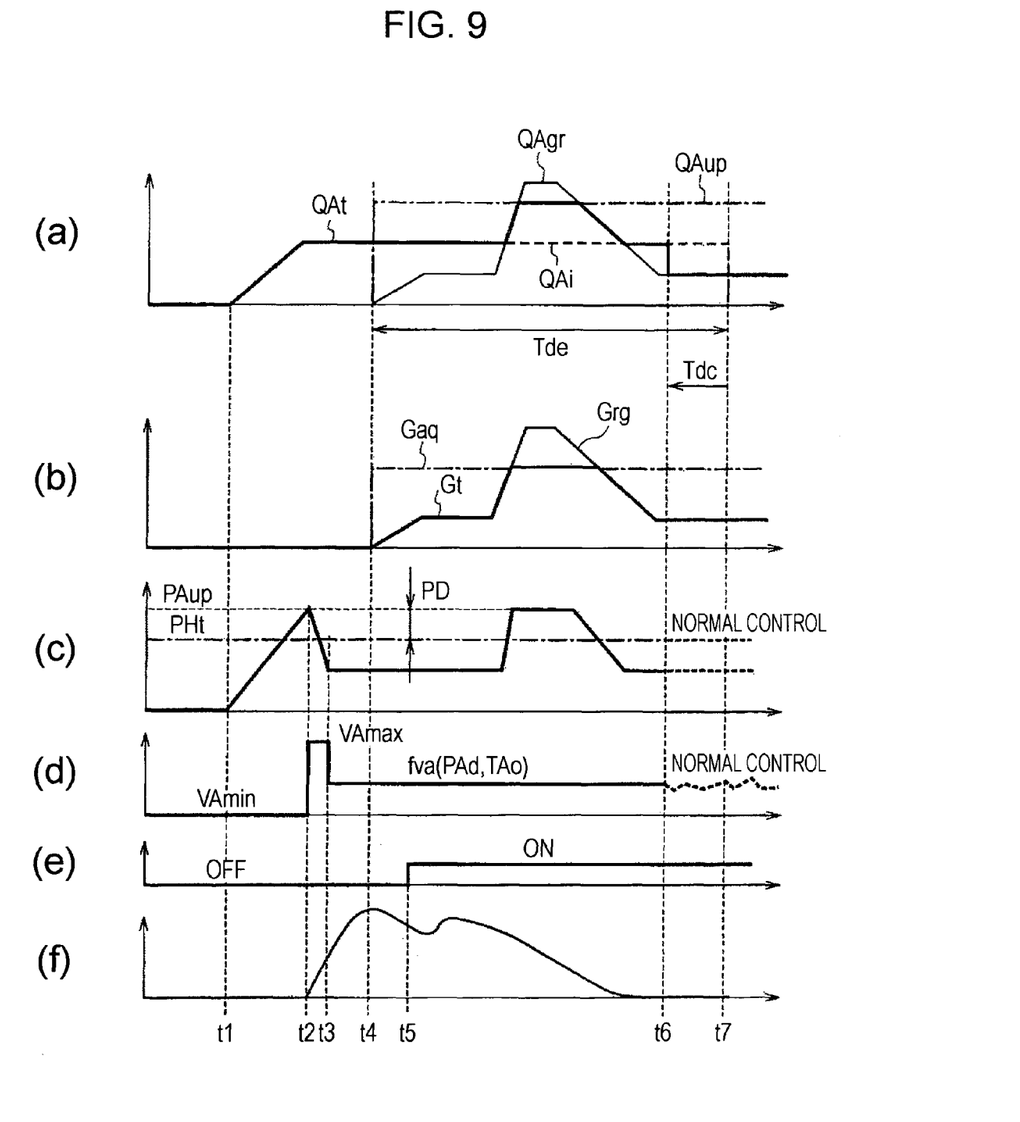
FIGS. 9(a) through 9(f) are timing charts of a start-up fuel gas disposal process.

In step S3, a target air flow QAt is set. The target air flow QAt is a target value of flow of air supplied to the cathodes of the fuel cell stack 1. The controller 30 controls the rotating rate of the compressor 20 on the basis of the target air flow QAt. In step S3, the target air flow QAt is set to be a standard air flow (dilution flow) QAi preliminarily set in relation to the start-up hydrogen disposal process. The standard air flow QAi is an optimum value determined through experiments and simulations on the basis of the power consumption of the compressor 20, vibration and operation noise of the compressor 20, the start-up time, system configuration, and the like. As shown in the timing chart shown in part (a) of FIG. 9 described below, in the initial stage, the target air flow is set to rise gradually (from essentially 0 to QAi) to prevent the power consumption of the compressor 20 from becoming excessively large. The process proceeds to step S4.

In step S4, a target hydrogen pressure PHt is set. The target hydrogen pressure PHt is the target value of the hydrogen pressure at the anodes of the fuel cell stack 1. The controller 30 controls the valve opening of the hydrogen pressure regulating valve 11 on the basis of the target hydrogen pressure PHt. In step S4, the target hydrogen pressure PHt is set to a value obtained by subtracting a permissible interelectrode differential pressure PD from an upper limit air pressure PAup (PHt=PAup−PD). In other words, the target hydrogen pressure PHt is set to the difference between the upper limit air pressure and the permissible interelectrode differential pressure. The upper limit air pressure PAup is the upper limit value of the air pressure permissible at the cathodes of the fuel cell stack 1 during the start-up hydrogen disposal process. The permissible interelectrode differential pressure PD is the difference in pressure permitted across the membrane between the cathodes and the anodes of the fuel cell stack 1. In other words, the interelectrode permissible differential pressure PD is the differential pressure permitted for preventing the polymer electrolyte films interposed between the cathodes and the anodes from deteriorating by an excessively large differential pressure. The process proceeds to step S5.

In step S5, an air pressure PAa is detected by the first air pressure sensor 31, which sends a signal to the controller 30. The controller 30 determines whether the input air pressure PAa is smaller than a elevation target pressure PAth1. The elevation target pressure PAth1 is the target value used to elevate the pressure of the air at the cathodes of the fuel cell stack 1 to a particular level. The elevation target pressure PAth1 is also a value for determining the timing for switching the valve opening of the air backpressure regulating valve 21 from the first valve opening (e.g., the minimum opening VAmin) to a larger valve opening, provided that the pressure of the air at the cathodes of the fuel cell stack 1 reaches the pressure elevation target value. In this embodiment, the elevation target pressure PAth1 is set to be the upper limit air pressure PAup.

If step S5 returns YES, i.e., if the air pressure PAa is smaller than the elevation target pressure PAth1, step S5 is performed again. During this time, air flow continues to be supplied to the cathodes by the compressor while the air backpressure regulating valve 21 is set to the first valve opening so that the air pressure in the cathodes increases. If step S5 returns NO, i.e., if the air pressure PAa has reached the elevation target pressure PAth1, the process proceeds to step S6.

In step S6, a target valve opening VAt is set. In step S6, the target valve opening VAt is set to be a second valve opening larger than the first valve opening. For example, the second valve opening can be a maximum valve opening VAmax of the air backpressure regulating valve 21. The target valve opening VAt in step S6 is set to be at least larger than a first standard valve opening (VAmin) at which the flow of air passing through the air backpressure regulating valve 21 becomes larger than the flow of air supplied from the compressor 20. The process proceeds to step S7.

In step S7, an air pressure PAa is detected by the first air pressure sensor 31, which sends a signal to the controller 30. The controller determines whether the input air pressure PAa is larger than a reduction target pressure PAth2. The reduction target pressure PAth2 is the target value used to reduce the pressure of the air at the cathodes of the fuel cell stack 1 to a particular level. The reduction target pressure PAth2 is also a value for determining the timing for switching the valve opening of the air backpressure regulating valve 21 from the second valve opening (e.g., the maximum opening VAmax) to a smaller valve opening, provided that the pressure of the air at the cathodes has reached the pressure reduction target value. In this embodiment, a subtracted value obtained by subtracting twice the permissible interelectrode differential pressure PD from the upper limit air pressure PAup is set to be the reduction target pressure PAth2 (Path2=PAup−2×PD). In other words, the reduction target pressure is set to be the difference between the upper limit air pressure and twice the permissible interelectrode differential pressure.

If step S7 returns YES, i.e., if the air pressure PAa is larger than the reduction target pressure PAth2, step S7 is performed again. During this time, air off-gas continues to exit the cathodes at a higher rate than air is supplied to the cathodes. If step S7 returns NO, i.e., if the air pressure PAa has reached the reduction target pressure PAth2, the process proceeds to step S8.

In step S8, an elapsed time T is counted. The elapsed time T is related to a constant pressure control that starts from step S9 described below. At the initial stage, the elapsed time T is set to 0. The process proceeds to step S9.

In step S9, the target valve opening VAt is set so that the pressure of air at the cathodes of the fuel cell stack 1 is constantly maintained at the reduction target pressure PAth2. The target valve opening VAt is set to be a third valve opening at which the pressure of air at the cathodes of the fuel cell stack 1 is maintained to be equal to the reduction target pressure PAth2. In particular, the third valve opening is a standard opening value that is corrected on the basis of the downstream off-gas pressure downstream of the air backpressure regulating valve 21 as measured by the second air pressure sensor 35 and the temperature of the exhaust air as measured by the temperature sensor 34. The corrected standard opening value is set to be the third valve opening or the target valve opening VAt.

Figure 3:
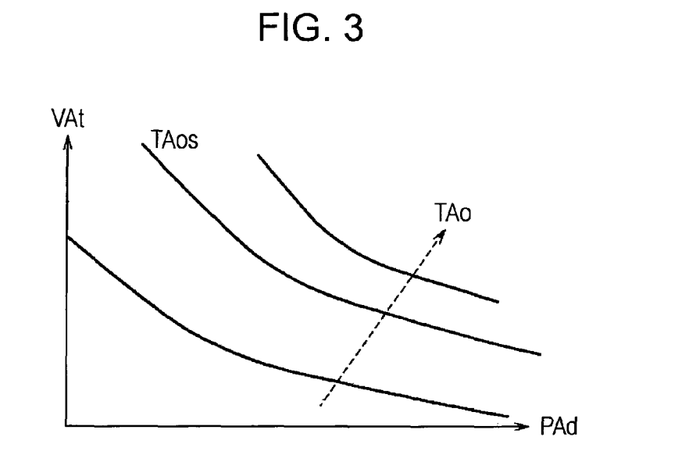
FIG. 3 is a graph showing a process of setting a target valve opening VAt in step S9.

FIG. 3 is a graph showing the process of setting the target valve opening VAt in step S9. The graph indicates the correspondence among the target valve opening VAt, the exhaust air temperature TAo and the downstream pressure PAd. The controller 30 stores the correspondence shown in the graph in the form of a map or a computational expression. The controller 30 can uniquely set the target valve opening Vat (a third valve opening value), which is a corrected second standard opening value, on the basis of the exhaust air temperature TAo and the downstream pressure PAd.

The target valve opening VAt may be set to satisfy the following relationship:

$$VAt = fva(PAd, TAo) = VAs2 \times k1 \times k2 \quad (1)$$

In relationship (1), fva is a function that uses the downstream pressure PAd and the exhaust air temperature TAo as the parameters and VAs2 represents a second standard valve opening.

Figure 4:
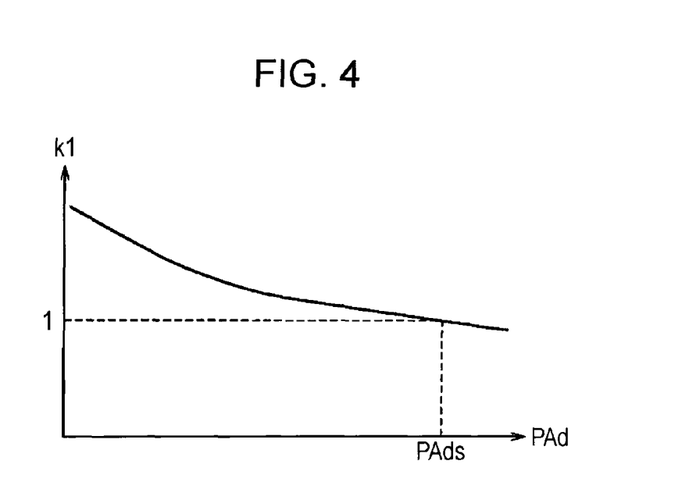
FIG. 4 is a graph illustrating a correction coefficient k1.

FIG. 4 is a graph illustrating a correction coefficient k1. In relationship (1), k1 represents a correction coefficient corresponding to the downstream pressure PAd. The correction coefficient k1 has a monotonically decreasing tendency with an increase in downstream pressure PAd and is equal to 1 at the standard downstream pressure PAds (the downstream pressure PAd at which the pressure of air at the cathodes at the second standard valve opening VAs2 equals the reduction target pressure PAth2). In other words, the greater the degree to which the downstream pressure PAd is smaller than the standard downstream pressure PAds, the greater the degree to which the set target valve opening VAt is larger than the second standard valve opening VAs2. The greater the degree to which the downstream pressure PAd is larger than PAds, the smaller the degree to which the set target valve opening VAt is smaller than the second standard valve opening VAs2.

Figure 5:
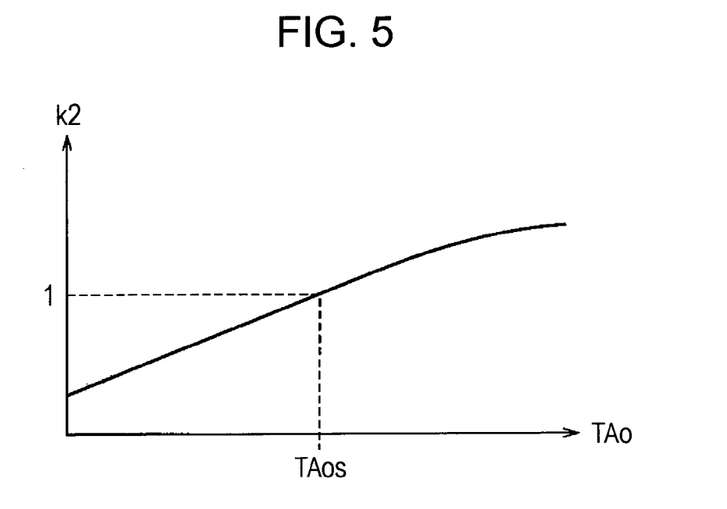
FIG. 5 is a graph illustrating a correction coefficient k2.

FIG. 5 is a graph illustrating a correction coefficient k2. In relationship (1), k2 represents a correction coefficient corresponding to the exhaust air temperature TAo. The correction coefficient k2 has a monotonically increasing tendency with an increase in exhaust air temperature TAo and is equal to 1 at a standard air temperature TAos (the exhaust air temperature TAo at which the pressure of air at the cathodes at the second standard valve opening VAs2 equals the reduction target pressure PAth2). In other words, the greater the degree to which the exhaust air temperature TAo is smaller than the standard air temperature TAos, the greater the degree to which the set target valve opening VAt is smaller then the second standard valve opening VAs2. The greater the degree to which the exhaust air temperature TAo is larger than the standard air temperature TAos, the greater the degree to which the set target valve opening VAt is larger than the second standard valve opening VAs2. The process proceeds to step S10.

In step S10, the target air flow QAt is set. In step S10, the smaller one of a first flow and a second flow is set to be the target air flow QAt. The first flow is equal to the upper limit air flow QAup.

$$QAup = fqlm(PAd, TAo) \quad (2)$$

Figure 6:
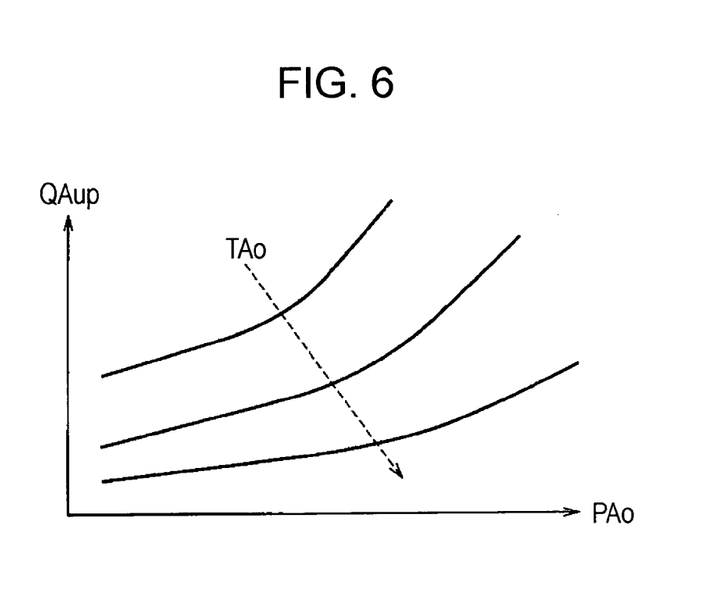
FIG. 6 is a graph illustrating an upper limit air flow QAup.

In relationship (2), fqlm is a function using the downstream pressure PAd and the exhaust air temperature TAo as the parameters. The upper limit air flow QAup can be calculated on the basis of the downstream pressure PAd and the exhaust air temperature TAo. The function fqlm calculates the flow at which the pressure of air at the cathodes of the fuel cell stack 1 can be suppressed to not more than the upper limit air pressure PAup when the target valve opening VAt of the air backpressure regulating valve 21 is determined on the basis of the function fva shown in relationship (1). The function fqlm is set in advance through experiments and simulations and the controller 30 stores this function in the form of a map or a computational expression. As shown in FIG. 6, according to the function fqlm, the upper limit air flow QAup has the following tendency. That is, QAup is set to a large value when the downstream pressure PAd is large. Even at the same downstream pressure PAd, the upper limit air flow QAup is set to a small value when the exhaust air temperature TAo is large.

The second flow is a larger one of a standard air flow QAi and a required air flow (power generation flow) QAgr.

$$QAgr = fqag(Grq) \quad (3)$$

Figure 7:
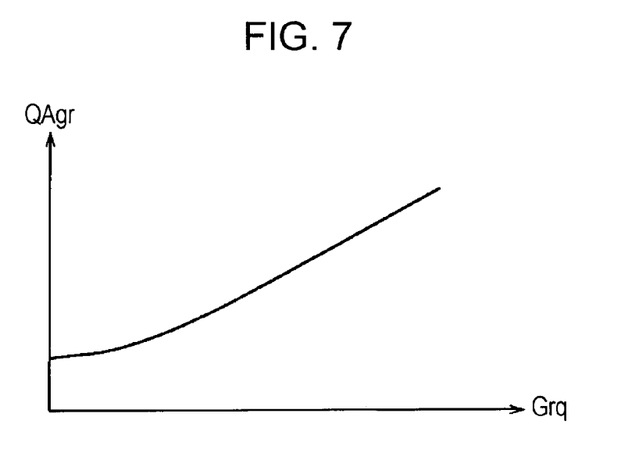
FIG. 7 is a graph illustrating a required air flow QAgr.

Here, fqag is a function using a required power Grq for the system as the parameter. The required air flow QAgr can be calculated on the basis of the required power Grq of the system calculated by the controller 30. The function fqag is set in advance through experiments and simulations and the controller 30 stores this function in the form of a map or a computational expression. As shown in FIG. 7, according to the function fqag, the required air flow QAgr is set to a large value as the required power Grq of the system increases. The process proceeds to step S11.

In step S11, a target power generation Gt is set. In step S11, the smaller one of the required power Grq of the system and a power generating capacity Gaq is set to be a target power generation Gt.

$$Gaq = fglm(QAup) \quad (4)$$

Figure 8:
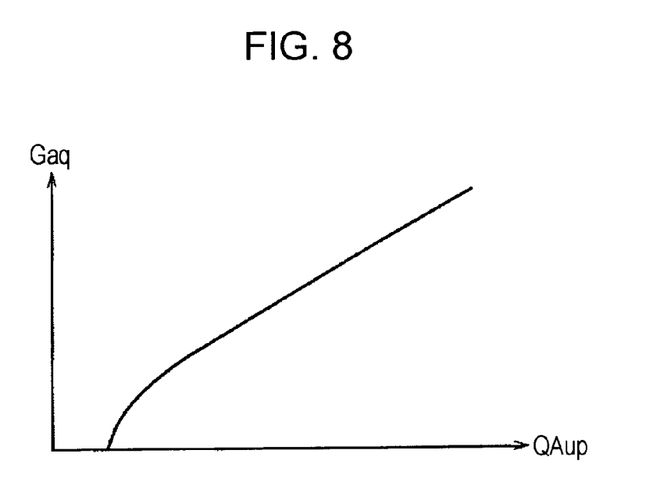
FIG. 8 is a graph illustrating a power generating capacity Gaq.

In relationship (4), fglm is a function using AQup as a parameter. The power generating capacity Gaq can be calculated on the basis of the upper limit air flow QAup. The function fglm calculates the amount of power that can be generated when the target air flow QAt is the upper limit air flow QAup. In particular, as shown in FIG. 8, the power generating capacity Gaq is set to a large value as the upper limit air flow QAup increases. The process proceeds to step S12.

In step S12, a decreased time Tdc is set. As discussed above in step S10, the target air flow QAt is set to a flow larger than the standard air flow QAi. Compared to the case where the target air flow QAt is maintained at the standard air flow QAi, the time required for a series of steps required for the start-up hydrogen disposal process can be shortened. The decreased time Tdc is this amount of time that has been shortened by setting the target air flow QAt to be larger than the standard air flow QAi in the step S10.

$$Tdc = Tdc + K \times \min(QAt - QAi, 0) \quad (5)$$

In the relationship, K represents a coefficient used for converting the subtracted value obtained by subtracting the standard air flow QAi from the target air flow QAt into the amount of time of the start-up hydrogen disposal process that can be shortened. This coefficient is set in advance to its optimum value through experiments and simulations. At the initial stage, the decreased time Tdc is set to 0. The process proceeds to step S13.

In step S13, the controller 30 determines whether or not the elapsed time T has reached a purge permitting time Tpo. The purge permitting time Tpo is the time for determining whether hydrogen in the cathodes and the air supply/discharge system has been sufficiently processed so that hydrogen in the fuel off-gas discharged from the hydrogen recirculation channel L2 has been diluted. That is, hydrogen that has entered into the air discharge channel L5 from the cathodes should be completely discharged outside by the start-up hydrogen disposal process before hydrogen enters into the air discharge channel L5 from the hydrogen recirculation channel L2 by the purging of the anode, and should be diluted thereby. Otherwise, the hydrogen concentration in the combined off-gas discharged outside may becomes excessively high. Thus, step S13 is conducted to determine whether or not the hydrogen from the cathodes has been sufficiently diluted and exhausted. The purge permitting time Tpo is set to an optimum value obtained through experiments and simulations.

If step S13 returns YES, i.e., if the elapsed time T has reached the purge permitting time Tpo, the process proceeds to step S14. If step S13 returns NO, i.e., if the elapsed time T has not reached the purge permitting time Tpo, the process proceeds to step S15.

In step S14, the purge flag Fpo is set to 1, which causes the purge valve 13 to be opened and the process of discharging the circulating gas from the hydrogen recirculation channel L2 to the off-gas discharge channel L5 starts. The process proceeds to step S15.

In step S15, the controller 30 determines whether or not the elapsed time T has reached the amount of time obtained by subtracting the decreased time Tdc from the standard processing time Tde. Here, the standard processing time Tde is the time required for the start-up hydrogen disposal process when the target air flow QAt is set to the standard air flow QAi. The standard processing time Tde is set to an optimum value determined through experiments and simulations. If step S15 returns NO, then the process goes back to step S8 described above. If step S15 returns YES, then the routine ends.

FIG. 9 is a timing chart of the start-up hydrogen disposal process. In this chart, part (a) indicates the air flow, part (b) indicates electrical power, and part (c) indicates the hydrogen pressure at the anodes and the air pressure at the cathodes. Part (d) indicates the valve opening of the air backpressure regulating valve 21, part (e) indicate the open/close status of the purge valve 13, and part (f) indicates the hydrogen concentration in the combined off-gas to be released outside through the off-gas discharge channel L5.

According to this embodiment, a start-up fuel gas disposal process is performed in starting the fuel cell system 1. In particular, the valve opening (target valve opening VAt) of the air backpressure regulating valve 21 is controlled to a first opening value (minimum valve opening VAmin) and air is supplied through the compressor 20 at a standard air flow (dilution flow) QAi. See time t1.

When the air pressure PAa at the cathodes reaches the elevation target pressure PAth1, the valve opening of the air backpressure regulating valve 21 is controlled to a second valve opening (releasing valve opening) which is larger than the first or minimum valve opening VAmin. See time t2.

Thus, in starting the system, air is supplied to the cathode while the flow of oxidant off-gas discharged from the cathodes of the fuel cell stack 1 is blocked. In this manner, the gas in the cathodes is suppressed from being forced out downstream. Moreover, since hydrogen in the cathodes mixes with air newly supplied, the hydrogen concentration can be decreased (diluted) and the reactions between hydrogen and oxygen on catalytic surfaces can be accelerated at the cathodes.

Once the air pressure PAa of the air at the cathodes of the fuel cell stack 1 reaches the elevation target pressure PAth1, the flow of the oxidant off-gas that has been blocked is released. As a result, the amount and rate of the flow of air passing through the air backpressure regulating valve 21 can be increased by the compressed air without increasing the rotation rate of the compressor 20. Thus, the hydrogen concentration can be decreased by the stirring effect. Moreover, hydrogen can be effectively disposed of (exhausted) while suppressing the load on the compressor 20. Also, the possibility of exceeding the maximum rated pressure of the oxidant gas system components can be decreased even when the fuel gas concentration in the oxidant gas system is high.

In this embodiment, the second or releasing valve opening is set to a level between the maximum valve opening VAmax and the first standard valve opening at which the flow of air passing through the air backpressure regulating valve 21 is larger than the flow of air supplied from the compressor 20.

In this manner, the flow of air passing through the air backpressure regulating valve 21 can be increased without increasing the rotation rate of the compressor 20. Thus, the hydrogen concentration can be effectively reduced while suppressing the load on the compressor 20.

In this embodiment, the compressor 20 is controlled so that the standard air flow QAi is constant.

In this manner, the flow of air passing through the air backpressure regulating valve 21 can be increased due to the effect of pressure reduction after pressure elevation. Thus, the standard air flow QAi can be made constant. Moreover, since the amount of drive of the compressor 20 can be controlled to a constant level, problems such as increased power consumption and increased driving noise and vibrations can be suppressed.

In this embodiment, the controller 30 controls the hydrogen pressure regulating valve 11 such that the hydrogen pressure at the anodes of the fuel cell stack 1 equals the pressure obtained by subtracting the interelectrode permissible differential pressure PD from the elevation target pressure PAth1. In this embodiment, the elevation target pressure PAth1 is set to the upper limit air pressure PAup.

In this manner, the diluting effect can be maximized by allowing for a maximum increase in the pressure of the oxidant gas toward the target elevation pressure and the maximum decrease in the pressure of the oxidant gas after the pressure elevation is released.

In this embodiment, after the controller 30 sets the valve opening of the air backpressure regulating valve 21 to the second or releasing valve opening, the controller 30 decreases the valve opening of the air backpressure regulating valve 21 from the second or releasing valve opening when the air pressure PAa at the anodes reaches the reduction target pressure PAth2 set to a third level lower than the elevation target pressure PAth1. The controller 30 starts a constant pressure control. See time t3. This constant pressure control involves controlling the valve opening of the air backpressure regulating valve 21 so that the air pressure at the cathodes is maintained at the reduction target pressure PAth2.

In this manner, the degree to which the pressure is reduced can be set within the range of the elevation target pressure PAth1 to the reduction target pressure PAth2.

According to this embodiment, the reduction target pressure PAth2 is set to a value obtained by subtracting twice the interelectrode permissible differential pressure PD from the elevation target pressure PAth1.

In this manner, the degree to which the pressure is reduced can be maximized within the system's permissible range. As a result, the flow of air passing through the air backpressure regulating valve 21 can be made larger than the flow of air supplied from the compressor 20.

In this embodiment, during the constant pressure control, the second standard valve opening VAs2 determined on the basis of the reduction target pressure PAth2 is corrected on the basis of the downstream pressure PAd of the air backpressure regulating valve 21. Also during the constant pressure control, the second standard valve opening VAs2 determined on the basis of the reduction target pressure PAth2 is corrected on the basis of the exhaust air temperature TAo.

Figure 11:
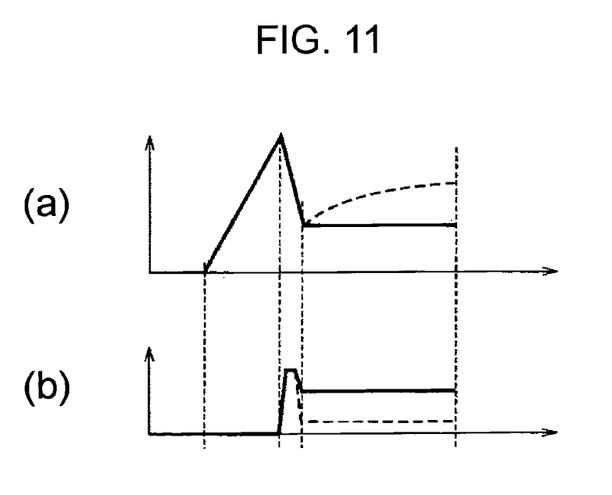
FIGS. 11(a) and 11(b) are graphs illustrating correction of the valve opening of an air backpressure regulating valve.

The flow rate and density vary according to the temperature (exhaust air temperature TAo) or pressure (downstream pressure PAd) of air passing through the air backpressure regulating valve 21. Thus, even when the valve opening of the air backpressure regulating valve 21 is controlled to the same value, the pressure loss of the air backpressure regulating valve 21 varies. Thus, as shown by broken lines in FIG. 11, air pressure may increase if control is continued on the basis of the second standard valve opening VAs2.

However, according to this embodiment, as shown by solid lines in FIG. 11, the valve opening of the air backpressure regulating valve 21 is corrected on the basis of the downstream pressure PAd or the exhaust air temperature TAo so that the air pressure at the anodes can be maintained at the reduction target pressure PAth2. Thus, the accuracy of the constant pressure control can be improved. Thus, phenomena such as an excessive decrease in air pressure beyond the permissible differential pressure of the fuel cell stack 1 and degradation of the diluting effect can be suppressed.

In this embodiment, after the controller 30 starts the constant pressure control, the controller 30 starts extracting the current output from the fuel cell stack 1 on the basis of the required power Grq. See time t4. The controller 30 supplies air at a target air flow QAt which is selected as the larger one of the required air flow (power generation flow) QAgr and the standard air flow QAi. The controller 30 also regulates the target air flow QAt so that the air pressure at the cathodes of the fuel cell stack 1 does not exceed the upper limit air pressure PAup, and also regulates the required power Grq.

In this manner, the output can be extracted from the fuel cell stack 1 even during the start-up hydrogen disposal process. When the air backpressure regulating valve 21 is controlled to the maximum valve opening VAmax, the pressure may not be always decreased by increasing the air flow exhausted from the cathodes. Thus, the flow of air supplied needs to be regulated. According to this embodiment, the target air flow QAt is regulated so as not to exceed the upper limit air pressure PAup, and the required power Grq is also regulated so that power can be stably generated at the regulated target air flow QAt. Accordingly, problems such as breakage of the fuel cell stack 1, voltage drop, and deterioration of the fuel cell stack 1 can be avoided.

In one embodiment, the controller 30 ends the constant pressure control when the elapsed time T, from the timing at which the constant pressure control is started, reaches the process time at which the hydrogen concentration downstream of the air backpressure regulating valve 21 becomes equal to or less than the target concentration when the accumulated value of the air flow in this case is the smallest. See time t7. Thus, the constant pressure control, i.e., the start-up hydrogen disposal process, can be adequately ended even when the air flow supplied to the cathodes is the minimum. Alternatively, the controller 30 ends the constant pressure control when the hydrogen concentration downstream of the air backpressure regulating valve 12 becomes equal to or less than the target concentration.

In another embodiment, the controller 30 sets the timing of ending the start-up fuel gas disposal process at a point, time t6, earlier than time t7. This is done on the basis of the accumulated value of the amount by which the target air flow QAt has exceeded the standard air flow QAi (i.e., the accumulated value of the excess target air flow QAt as compared with the standard air flow QAi that would be enough to adequately dilute the hydrogen concentration over time T equal to time t7). In other words, if the target air flow QAt has exceeded the standard air flow QAi for at least a portion of the time after time t3, the start-up fuel gas disposal process can be shortened due to the increased dilution effect of the excess air flow to the cathode. The amount by which the start-up fuel gas disposal process can be shortened is calculated based on the difference between the accumulated target air flow QAt (i.e., the integrated area under the QAt curve as in FIG. 10) and the theoretical accumulated standard air flow QAi (i.e., the integrated area under the QAi curve as in FIG. 10), which is termed herein the accumulated value of the amount by which the target airflow QAt has exceeded the standard air flow QAi. Thus, the start-up fuel gas disposal process can be ended at time t6 which is earlier than time t7.

Figure 10:
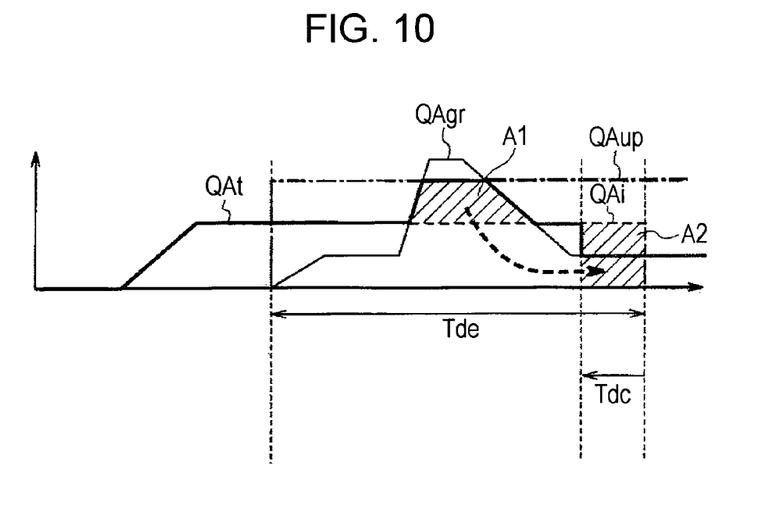
FIG. 10 is a chart illustrating the timing of ending the start-up fuel gas disposal process.

As shown in FIG. 10, a region A1 indicates the accumulated value of the amount by which the target air flow QAt has exceeded the standard air flow QAi. In other words, air in an amount corresponding to the region A1 has been supplied in excess compared to the minimum amount of air necessary for dilution. Thus, compared to the case where the target air flow QAt is maintained at the standard air flow QAi, the timing of ending can be set to an earlier point by a region A2 corresponding to the region A1. Thus, the start-up time can be shortened.

In this embodiment, the controller 30 controls the purge valve 13 to be closed in the initial stage. Then the controller 30 controls the purge valve 13 to open after a dilution process time needed to dilute hydrogen discharged through the purge channel L3 with off-gas from the cathodes. See time t5. This is to prevent the simultaneous discharge into the discharge channel L5 of hydrogen from the recirculation channel L2 and hydrogen carried in the oxidant gas from the cathode, to prevent an excessively high concentration of hydrogen in the off-gas within the discharge channel L5. The dilution process time can be set based on experiments and simulations.

According to this process, impurities such as nitrogen remaining in the anodes of the fuel cell stack 1 and the circulation systems during the shut-down period of the system can be discharged early and the hydrogen diluting performance can be ensured.

The controller 30 can set the timing for controlling the purge valve 13 to open at a point before the lapse of the dilution process time on the basis of the length of the purge channel L3 between the purge valve 13 and the point connecting to the off-gas discharge channel L5. For example, the dilution process time can be controlled based on the concentration of hydrogen in the exhaust (off-gas discharge channel L5) as indicated in FIG. 9(e). In this manner, impurities can be discharged at an earlier stage.

While the invention has been disclosed with reference to certain preferred embodiments, numerous modifications, alterations, and changes to the described embodiments are possible without departing from the sphere and scope of the invention, as defined in the appended claims and equivalents thereof. Accordingly, it is intended that the invention not be limited to the described embodiments, but that it have the full scope defined by the language of the following claims.

What is claimed is:

1. A fuel cell system comprising:
   a fuel cell including an anode, a cathode, and an electrolyte membrane disposed between the anode and the cathode, the fuel cell being configured to generate electrical power through electrochemical reactions between a fuel gas supplied to the anode and an oxidant gas supplied to the cathode;
   an oxidant gas supplying device configured to supply the oxidant gas to the cathode of the fuel cell;
   an oxidant gas backpressure regulating device configured to regulate the pressure of the oxidant gas at the cathode of the fuel cell according to a valve opening, the oxidant gas backpressure regulating device being disposed downstream of an oxidant gas outlet of the fuel cell;
   a first pressure detecting device configured to detect the pressure of the oxidant gas at the cathode of the fuel cell; and
   a controller comprising a microcomputer and a control program for controlling the fuel cell system during a start-up fuel gas disposal process, the controller being programmed to perform the following operations during startup:
      control the oxidant gas supplying device to supply the oxidant gas at a standard oxidant gas flow rate, wherein the standard oxidant gas flow rate is an optimum value determined based on a power consumption of the oxidant gas supplying device, a noise and vibration of the oxidant gas supplying device, and a startup time;
      control the valve opening of the oxidant gas backpressure regulating device to a first target valve opening, wherein the first target valve opening is a fixed minimum valve opening amount that allows for a non-zero flow rate of oxidant gas that is less than the standard oxidant flow rate to be exhausted from the cathode; and
      control the valve opening of the oxidant gas backpressure regulating device to a second target valve opening which is greater than the first target valve opening when the pressure of the oxidant gas detected by the first pressure detecting device reaches an elevation target pressure wherein the second target valve opening is a fixed value sufficiently large that an amount of oxidant gas equal to or larger than the standard oxidant gas flow rate is exhausted from the cathode;
      thereby diluting with oxidant gas any fuel gas that has permeated through the membrane from the anode to the cathode during a previous shut-off period of the system.

2. The fuel cell system of claim 1, wherein:
the second valve opening is between a maximum valve opening and a standard valve opening, the standard valve opening corresponding to a valve opening at which the flow of the oxidant gas passing through the oxidant gas backpressure regulating device is at least slightly larger than the flow of the oxidant gas supplied from the oxidant gas supplying device.

3. The fuel cell system of claim 1, wherein:
the standard oxidant gas flow is the flow of the oxidant gas sufficient for diluting with oxidant gas, the fuel gas that has permeated from the anode to the cathode during the shut-off period of the system; and
the controller is further configured to control the oxidant gas supplying device so that the standard oxidant gas flow is constant.

4. The fuel cell system of claim 1, further comprising:
a fuel gas supplying device configured to supply the fuel gas to the anode of the fuel cell; and
a fuel gas pressure regulating device configured to regulate the pressure of the fuel gas at the anode of the fuel cell;
wherein the controller is further configured to control the fuel gas pressure regulating device so that the pressure of the fuel gas at the anode of the fuel cell equals the difference between the elevation target pressure and a permissible interelectrode differential pressure of the fuel cell.

5. The fuel cell system of claim 1, wherein:
the controller is further configured to set the elevation target pressure to a permissible upper limit pressure for the cathode of the fuel cell.

6. The fuel cell system of claim 1, wherein the controller is further configured to:
set a reduction target pressure to a pressure smaller than the elevation target pressure;
determine whether the pressure of the oxidant gas detected by the first pressure detecting device has reached the reduction target pressure after the valve opening of the oxidant gas backpressure regulating device is controlled to the second valve opening;

control the valve opening of the oxidant gas backpressure regulating device from the second valve opening to a third valve opening when the pressure of the oxidant gas reaches the reduction target pressure; and execute a constant pressure control after the pressure of the oxidant gas reaches the reduction target pressure by controlling the valve opening of the oxidant gas backpressure regulating device so that the pressure of the oxidant gas at the cathode is maintained at the reduction target pressure.

7. The fuel cell system of claim 6, wherein:
the controller is further configured to set the reduction target pressure to be the difference between the elevation target pressure and twice a permissible interelectrode differential pressure of the fuel cell.

8. The fuel cell system of claim 6, further comprising:
a second pressure detecting device configured to detect the pressure of the oxidant gas downstream of the oxidant gas backpressure regulating device;
wherein the controller is further configured to control the valve opening of the oxidant gas backpressure regulating device based on the pressure of the oxidant gas detected by the second pressure detecting device during execution of the constant pressure control.

9. The fuel cell system of claim 6, further comprising:
a temperature detecting device configured to detect the temperature of the oxidant gas discharged from the cathode of the fuel cell;
wherein the controller is further configured to control the valve opening of the oxidant gas backpressure regulating device based on the temperature of the oxidant gas detected by the temperature detecting device.

10. The fuel cell system of claim 6, wherein the controller is further configured to:
determine a time from the start of the constant pressure control at which the hydrogen concentration downstream of the oxidant gas backpressure regulating device becomes equal to or less than a target concentration when the oxidant gas supply device is supplying the oxidant gas at the standard oxidant gas flow; and
end the constant pressure control when the time has elapsed.

11. The fuel cell system of claim 6, wherein the controller is further configured to:
start extracting the electrical power produced from the fuel cell based on a required power of the fuel cell system after the constant pressure control is started;
supply the oxidant gas at a target flow which is the smaller of the standard oxidant gas flow and a power generation flow, the power generation flow being the flow of the oxidant gas required for the fuel cell to generate power; and
regulate the target flow of the oxidant gas and the required power so that the pressure of the oxidant gas at the cathode of the fuel cell does not exceed the elevation target pressure.

12. The fuel cell system of claim 11, wherein:
the controller is further configured to end the start-up fuel gas disposal process at a time based on an accumulated value of the amount by which the target flow of the oxidant gas has exceeded the standard oxidant gas flow.

13. The fuel cell system of claim 4, further comprising:
a recirculation channel that allows a fuel off-gas discharged from the anode to mix with the fuel gas from the fuel gas supplying device;
a discharge channel having one end connected to the recirculation channel and another end connected to an oxidant discharge channel through which an oxidant off-gas is exhausted; and
a discharging device configured to discharge gas from the recirculation channel, the discharging device being provided in the discharge channel;
wherein the controller is further configured to:
first control the discharging device to close; and
then control the discharging device to open after the fuel off-gas discharged through the discharge channel has been sufficiently diluted with the oxidant off-gas discharged from the cathode.

14. The fuel cell system of claim 13, wherein:
the controller is further configured to cause the discharging device to discharge gas from the recirculation channel based on the length of the discharge channel.

15. The fuel cell system of claim 1, wherein the first target valve opening is a fixed minimum valve opening amount that allows for the pressure of the oxidant gas at the cathode detected by the first pressure detecting device to increase.

* * * * *